US008547619B2

(12) United States Patent
Moidu

(10) Patent No.: US 8,547,619 B2
(45) Date of Patent: Oct. 1, 2013

(54) TILTABLE MEMS MIRROR
(75) Inventor: Abdul Jaleel K. Moidu, Nepean (CA)
(73) Assignee: JDS Uniphase Corporation, Milpitas, CA (US)
( * ) Notice: Subject to any disclaimer, the term of this patent is extended or adjusted under 35 U.S.C. 154(b) by 486 days.
(21) Appl. No.: 12/960,902
(22) Filed: Dec. 6, 2010
(65) Prior Publication Data
US 2011/0149362 A1 Jun. 23, 2011

Related U.S. Application Data
(60) Provisional application No. 61/289,473, filed on Dec. 23, 2009.
(51) Int. Cl.
G02B 26/08 (2006.01)
(52) U.S. Cl.
USPC .............. 359/226.2; 359/224.1; 359/900; 359/904
(58) Field of Classification Search
USPC ............. 359/196.1–226.2, 298, 846, 848, 359/900, 904
See application file for complete search history.

(56) References Cited

U.S. PATENT DOCUMENTS

| 6,704,132 | B2 | 3/2004 | Dewa | 359/290 |
|---|---|---|---|---|
| 6,791,730 | B2 | 9/2004 | Sniegowski et al. | 359/223.1 |
| 6,956,684 | B2 | 10/2005 | Orcutt | 359/199.1 |
| 6,999,215 | B2 | 2/2006 | Dewa et al. | 359/198.1 |
| 7,002,719 | B2 | 2/2006 | Tran | 359/223.1 |
| 7,050,211 | B2 | 5/2006 | Orcutt | 359/224.1 |
| 7,057,783 | B2 * | 6/2006 | Kato et al. | 359/224.1 |
| 7,259,900 | B2 | 8/2007 | Orcutt | 359/224.1 |
| 2005/0139542 | A1 | 6/2005 | Dickensheets et al. | 210/490 |
| 2008/0018975 | A1 | 1/2008 | Moidu | 359/226.1 |

OTHER PUBLICATIONS

Kaiser, Todd J., et al, "Silicon Nitride Biaxial Pointing Mirrors with Stiffening Ribs", Moems and Miniaturized Systems II, San Francisco, CA Oct. 22-24, 2001, Proceedings of the SPIE—The International Society for Optical Engineering, 2001, SPIE-INT Soc. Opt. Eng. pp. 276-282.
Lutzenberger, Jeffrey, et al, "Vertical stiffening Members for Flatness Control of Surface Micromachined Structures", Moems and Miniaturized Systems II San Francisco, CA Oct. 22-24, 2001, Proceedings of the SPIE—The International Society for Optical Engineering, 2001, SPIE—INT Soc. Opt. Eng. pp. 238-246.
Lin, Hung-Yi, et al, "Rib-Reinforced Micromachined Beam and its Applications", Journal of Micromechanics and Microengineering, Mar. 2000, vol. 10, No. 1 pp. 93-99.
Mita, Makkoto, et al, "An Out-of-Plane Polysilicon Actuator with a Smooth Vertical Mirror for Optical Fiber Switch Application", Broadband Optical Networks and Technologies: An Emerging Reality/Optical MEMS/Smart Pixels/Organic Optics and Optoelectronics, 1998 IEEE/Leos Summer Topical Meetings Monterey, CA Jul. 20-24, 1998, New York NY IEEE pp. II-33-II-34.
Nee, Jocelyn T., et al, "Stretched-Film Micromirrors for Improved Optical Flatness", 2000 Ieee, pp. 704-709.
Himmer, Phillip A., et al, "Micromachined Silicon Nitride deformable Mirrors for Focus Control", Optics Letters, Optical Society of America, Washington, vol. 26, NR. 16 pp. 1280-1282.
Nee, Jocelyn T., et al, "Lightweight, Optically Flat Micromirrors for Fast Beam steering", 2000 IEEE/Leos International conference on Optical Mems (cat. No. 00EX399), 2000 IEEE/LEOS International Conference on Optical MEMS, Kauai, HI, pp. 21-24 Aug. 2000, Piscataway NJ IEEE, pp. 9-10.

* cited by examiner

Primary Examiner — James Phan
(74) Attorney, Agent, or Firm — Teitelbaum & MacLean; Neil Teitelbaum; Doug MacLean

(57) ABSTRACT

A MEMS mirror is disclosed having thickness correlated with the intensity profile of an impinging optical beam, so as to reduce moment of inertia of the MEMS mirror while preserving optical quality of the reflected beam. It is the mirror edges that contribute the most to the moment of inertia, while it is generally the mirror center that contributes the most to a reduction of the quality of an optical beam reflected from the mirror. Accordingly, by providing a mirror having laterally varying thickness matched to the local variation of the intensity of the optical beam, the quality of the latter may be preserved while the moment of inertia of the mirror may be significantly reduced. The thickness of MEMS mirrors may be varied continuously or stepwise; in one direction or in two mutually orthogonal directions.

13 Claims, 3 Drawing Sheets

TILTABLE MEMS MIRROR

CROSS-REFERENCE TO RELATED APPLICATIONS

The present invention claims priority from U.S. Provisional Patent Application No. 61/289,473, filed Dec. 23, 2009, which is incorporated herein by reference.

TECHNICAL HELD

The present invention relates to micro-electro-mechanical (MEMS) devices, and in particular to tiltable MEMS mirrors for redirecting beams of light.

BACKGROUND OF THE INVENTION

Micro-electro-mechanical systems (MEMS) arc increasingly used in optical switching and scanning applications. Visual displays based on switchable MEMS micromirrors capable to withstand billions of switching cycles are now common. Using MEMS devices in fiberoptic switches attracts a particular interest. Light emitted by optical fibers can be tightly focused, which facilitates utilization of MEMS micromirrors to reliably switch optical signals between different optical fibers or waveguides.

In recent years, multiport wavelength-selective optical switches have been used to provide wavelength-specific switching of optical signals between different optical ports. To increase the number of optical ports in a wavelength-selective optical switch, there has been a tendency to focus optical beams reflected by MEMS micromirrors tighter and tighter, down to a value limited by diffraction. It is a well known principle of optics that a tighter focusing requires a larger beam size before focusing, to reduce the diffraction limit value. This calls for larger MEMS micromirrors to be able to redirect larger optical beams. To ensure good quality of a reflected optical beam, the mirrors have to be very flat. To keep the mirror flatness at a larger mirror size, the MEMS micromirrors have also to be made thicker.

Increased thickness of MEMS micromirrors, however, causes another problem to occur. The problem is related to dynamic performance of MEMS micromirrors. It takes longer to tilt larger, bulkier MEMS micromirrors because of increased moment of inertia (also called mass moment of inertia or rotational inertia) of the MEMS micromirrors. Furthermore, increased mass and moment of inertia increases sensitivity of MEMS mirrors to shock and vibration. These highly detrimental effects could be overcome by increasing stiffness of torsional hinges used to suspend MEMD micromirrors. However, increasing the stiffness of hinges requires increasing electrostatic torque created by MEMS actuators to offset the increased spring force of stiffer hinges. Unfortunately, there is a limit to a magnitude of the torque that can be generated, due to geometrical and electronic driver limitations.

A general approach used in the prior art to solving the problem of reducing mirror mass is to make the mirrors hollow and/or to provide "rigidity ribs" or truss structures to reinforce the larger MEMS mirrors. By way of example, Dewa in U.S. Pat. No. 6,704,132 incorporated herein by reference, discloses a micromirror having a plurality of truss members disposed under a gimbal portion of the micromirror, allowing the gimbal and mirror portions to be made of a thinner material, thereby reducing the mass and increasing the resonant frequency of the micromirror device. Sniegowski et al. in U.S. Pat. No. 6,791,730, incorporated herein by reference, discloses a reinforced mirror microstructure, in which adjacent structural layers are interconnected by a plurality of vertically disposed columns, or a plurality of laterally extending rails or ribs.

Moidu in U.S. Patent Application Publication 20080018975, incorporated herein by reference, discloses a large "micromirror", for example 3 mm by 4 mm, having sufficient rigidity to ensure a low mirror curvature, for example a radius of curvature greater than 5 m, and a high resonance frequency of greater than 1 kHz. The micromirror of Moidu has a honeycomb structure sandwiched between two solid and smooth silicon layers.

One drawback of the ribs and honeycomb-reinforced MEMS micromirror structures of the prior art is the difficulty of manufacturing complex three-dimensional structures. For example, the honeycomb structure of Moidu, although providing a very good stiffness to rotational inertia ratio, requires multiple wafer stacked together to form the honeycomb core and skins, thus increasing manufacturing complexity and cost.

The prior art is lacking a large, for example more than 1 mm in size, MEMS mirror having a high quality of its reflective surface and low moment of inertia, that would also be relatively easy to manufacture. Accordingly, it is a goal of the invention to provide such a MEMS mirror, as well as a method of lessening the moment of inertia of a MEMS mirror, while preserving a high quality of its reflective surface, for example low curvature of the surface. A high quality of a MEMS reflective surface results in a high quality of an optical beam reflected from that surface, and ultimately in an improved performance of an optical device the MEMS mirror is used in.

SUMMARY OF THE INVENTION

In the present invention, it is recognized that it is the mirror edges that contribute the most to the moment of inertia (rotational inertia), while it is generally the mirror center that contributes the most to a reduction of the quality of an optical beam reflected from the mirror. This is because the local intensity of an optical beam is typically the highest at the beam center, and the beam center is usually aligned to the mirror center. Accordingly, by providing a mirror having laterally varying thickness matched to the local variation of the intensity of the optical beam, the quality of the latter may be preserved while the moment of inertia of the mirror may be significantly reduced.

In accordance with the invention there is provided a MEMS mirror device including a substrate, a MEMS mirror having a top reflective surface and a profiled bottom surface, and a hinge extending from the MEMS mirror enabling the MEMS mirror to pivot about a tilt axis above the substrate. The MEMS mirror is absent any voids or ribs. It has a longitudinal central axis perpendicular to the tilt axis and crossing the tilt axis at a first point, with first and second ends being disposed on the longitudinal axis at the outer free ends of the MEMS mirror. The profiled bottom surface is such that the MEMS mirror thickness, between the top and bottom surfaces, decreases in going from the first point towards the first and the second ends of the MEMS mirror, for reducing a moment of inertia of the MEMS mirror about the tilt axis.

In accordance with another aspect of the invention there is provided a MEMS optical switch for switching an optical beam having a laterally varying intensity, comprising the tiltable MEMS mirror device for steering the optical beam, the MEMS mirror having a variation of the thickness correlated with the beam intensity variation, whereby the moment of inertia of the MEMS mirror is lessened while keeping a pre-defined quality of the steered optical beam, so as to ensure a pre-defined extinction ratio and insertion loss of the MEMS optical switch.

The mirror thickness can decrease smoothly and monotonically, or it can decrease in stepwise fashion for manufacturability considerations. The thickness is correlated with the beam intensity variation, so that the moment of inertia of the MEMS mirror is lessened while keeping a pre-defined quality of the optical beam. For example, the thickness can vary laterally as t(x,y), the beam intensity varies laterally as I(x,y), wherein $t(x,y)=c*I^n(x,y)$, wherein preferably n>=0.5 and c is a constant. For stepped mirrors, the step position can be correlated with a local beam intensity decreasing to a predetermined percentage of a peak beam intensity.

In accordance with another aspect of the invention there is further provided a method of manufacturing a MEMS mirror having a tilt axis and a longitudinal central axis perpendicular to the tilt axis and crossing the tilt axis at a first point, and having first and second ends disposed on the longitudinal axis at the outer free ends thereof, the method comprising:
(a) providing a mirror wafer having a top surface for supporting a mirror layer, and a bottom surface, the mirror wafer being absent any voids or ribs therein; and
(b) profiling the bottom surface of the mirror wafer, so as to cause the MEMS mirror to have thickness decreasing in going from the first point towards the first and the second ends for reducing a moment of inertia of the MEMS mirror about the tilt axis.

The thickness of the MEMS mirror is correlated with the beam intensity variation, whereby the moment of inertia of the manufactured MEMS mirror is lessened while keeping a pre-defined quality of the optical beam.

In accordance with another aspect of the invention, there is further provided a method of manufacturing a MEMS optical switch for switching an optical beam having a laterally varying intensity, comprising manufacturing a MEMS mirror having the thickness correlated with the beam intensity variation, whereby the moment of inertia of the manufactured MEMS mirror is lessened while keeping a pre-defined quality of the switched optical beam, so as to ensure a pre-defined extinction ratio and insertion loss of the MEMS optical switch.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1:
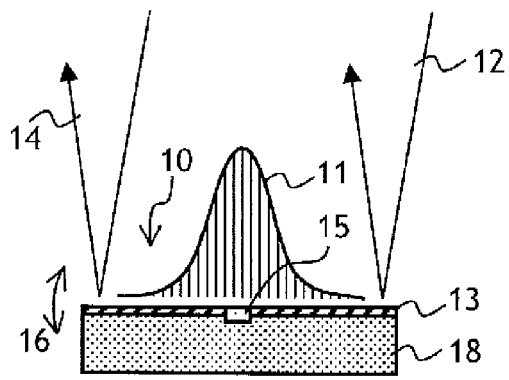
FIG. 1 is a side cross-sectional view of a conventional flat uniform mirror having an optical beam intensity distribution superimposed thereupon.

Referring now to FIG. 1, an optical beam 12 having a spatial intensity distribution 11 impinges on a conventional flat MEMS mirror 10 having a substrate 18 supporting a reflective coating 13. The optical beam 12 reflects from the reflective coating 13, as shown at 14. The MEMS mirror 10 has a torsional hinge 15 for tilting the MEMS mirror 10 as shown by arrows 16, thus steering the reflected optical beam 14. The MEMS mirror 10 has a uniform thickness.

The reflective coating 13 of the MEMS mirror 10 typically has a non-zero curvature due to residual stresses, or thermally induced stresses in the reflective coating 13 due to thermal mismatch with the substrate 18. When the MEMS mirror 10 is used in an optical switch, the curvature of the reflective coating 13 of the MEMS mirror 10 has an adverse effect on the optical insertion loss and the extinction ratio of the optical switch. The magnitude of these adverse effects is approximately proportional to the fourth power of the mirror size or optical beam size. High port count wavelength selective switch (WSS) devices require relatively large optical beams. Thus, the flatness of the MEMS mirror 10 is of a considerable concern, especially for high port count WSS devices.

As noted above, one traditional solution to ensuring flatness of the MEMS mirror 10 is to increase the thickness of the substrate 18. However, increased thickness of the substrate 18 worsens dynamic performance of the MEMS mirror 10. Due to a requirement for the MEMS mirror 10 to withstand shock and vibration, the MEMS mirror 10 should have a resonance frequency of rotational oscillations above a certain threshold. The resonance frequency is proportional to a ratio of the spring constant of the torsional hinge 15 to the moment of inertia of the MEMS mirror 10, which depends on the thickness of the substrate 18. The spring constant of the torsional hinge 15 is limited by a maximum torque created by an actuator, not shown, which depends on a maximum voltage applied to the actuator. Therefore, the moment of inertia and the maximum thickness of the substrate 18 are limited in case of the MEMS mirror 10 by the maximum driving voltage available, and by the resonance frequency requirement.

Figure 2:
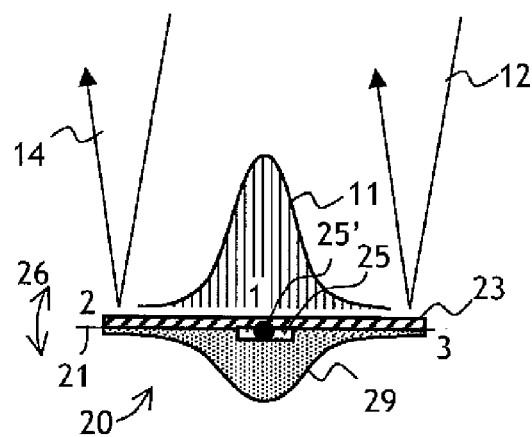
FIG. 2 is a side cross-sectional view of a flat mirror with a spatially varying thickness, having an optical beam intensity distribution superimposed thereupon.

The present invention overcomes this limitation by providing a MEMS mirror having a laterally varying thickness, which preferably matches laterally varying optical beam intensity. Referring now to FIG. 2, a MEMS mirror 20 has a top reflective surface 23 and a bottom surface 29. The bottom surface 29 is profiled (non-flat), so that the MEMS mirror 20 has a laterally varying thickness. To simplify the mirror structure, no voids or ribs are present in the MEMS mirror 20. The MEMS mirror 20 has a hinge 25 defining a tilt axis 25' of the MEMS mirror 20 for tilting as shown with arrows 26. A longitudinal axis 21 is perpendicular to the tilt axis 25' and is crossing the tilt axis 25' at a point 1. The thickness of the MEMS mirror 20 decreases in going from the point 1 towards ends 2 and 3 of the MEMS mirror 20. The ends 2 and 3 are disposed on the longitudinal axis 21. As noted above, thinning down the MEMS mirror 20 at its ends 2 and 3, where the optical beam intensity is reduced, facilitates reducing the moment of inertia without a significant reduction of the quality of the reflected optical beam 14. Preferably, the lateral profile of the thickness variation of the MEMS mirror 20 correlates with the optical intensity profile 11 of the incoming optical beam 12. In this way, the moment of inertia of the MEMS mirror 20 can be lessened while keeping a pre-defined quality of the reflected optical beam 14. Note that the moment of inertia is proportional to square of a distance to the pivot axis; therefore the moment of inertia can be reduced dramatically by having less mass farther from the pivot, as is the case in the present invention.

The MEMS mirror 20 is the thickest at the point 1, where the intensity profile 11 of the impinging optical beam 12 is at maximum. At or near the point 1, the undesired curvature of the reflective layer 23 of the MEMS mirror 20 is at minimum, which lessens the optical losses upon subsequent fiber coupling, and also improves switching ratio (extinction ratio) of a MEMS optical switch the MEMS mirror 20 is used in.

Preferably, the thickness profile t(x,y) of the MEMS mirror 20 varies as $$t(x,y)=c*I^n(x,y) \quad (1)$$

wherein I(x,y) is the intensity profile 11 of the impinging optical beam 12, the plane (x,y) is a plane of the reflective layer 23, n>=0.5, and c is a constant. It follows from Eq. (1) that when the function I(x,y) is exponential, as is commonly the case, the function t(x,y) is also exponential.

Figure 3:
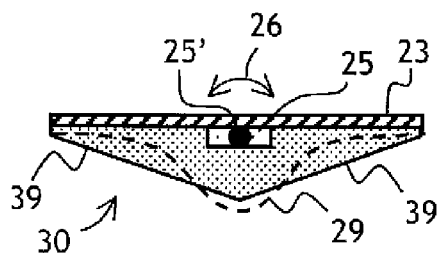
FIG. 3 is a side cross-sectional view of a flat mirror having a linearly varying thickness.

The thickness of the MEMS mirror 20 decreases smoothly and monotonically in going from the point 1 toward the ends 2 and 3. However, it may be difficult to realize such a smoothly varying thickness profile using existing MEMS fabrication methods. Other, simpler forms of the thickness profile can be more practical. Referring now to FIG. 3, a bottom surface 39 of a MEMS mirror 30 is profiled so that the MEMS mirror 30 has a linearly varying thickness profile. This thickness profile is an approximation of a "desired" Gaussian thickness profile, corresponding to the bottom surface 29 shown in FIG. 3 in a dashed line for comparison purposes. The linearly varying thickness profile due to the bottom surface 39 can be obtained using a linearly graded etching mask.

Figure 4:
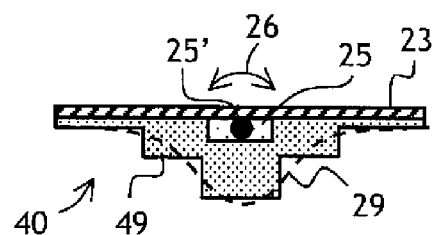
FIGS. 4 and 5 are side cross-sectional views of a flat mirror having a stepwise varying thickness.

Another practical form of a thickness profile is a stepped profile. Turning to FIG. 4, a MEMS mirror 40 has a bottom surface 49 having a stepped profile. The total number of steps is four, two for each end of the MEMS mirror 40. This "stepped" profile is also an approximation of the "desired" Gaussian thickness profile 29 shown in FIG. 4 in a dashed line. More steps can be used if desired, for a better approximation of the Gaussian profile 29. The step location is preferably correlated with a location where a local beam intensity decreases to a pre-determined percentage of a peak beam intensity.

Figure 5:
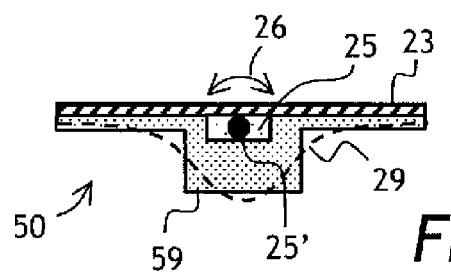

Referring now to FIG. 5, a MEMS mirror 50 has a bottom surface 59 having only one step. One advantage of the MEMS mirror 50 is manufacturability. Only two masks are required to manufacture a step in the MEMS mirror 50. By way of example, the silicon MEMS mirror 50 having a length of 1300 um, thickness of 30 um in the middle and 15 um at the ends, a step location half-way to the mirror center, that is 750 um from each edge, has an optical performance comparable to that of the mirror 10 of FIG. 1 of the same length and uniform thickness of 30 um, while having only 33% of the moment of inertia of the MEMS mirror 10 of FIG. 1.

Figure 6:
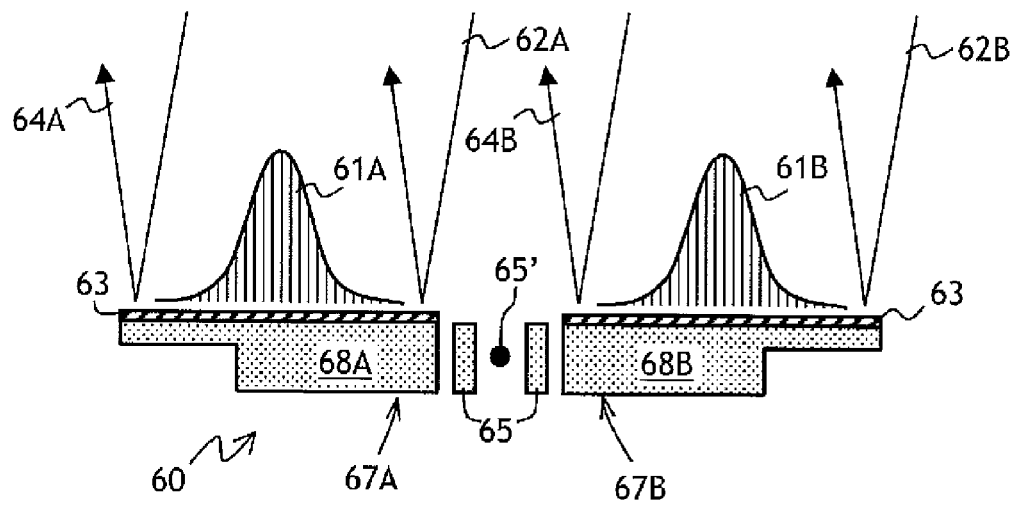
FIG. 6 is a side cross-sectional view of a MEMS mirror having a hinge structure in the middle.

When a "polarization diversity" arrangement is used in an optical switch to achieve a polarization independent functionality, two beams of light, corresponding to two orthogonal polarization components of the original optical beam, co-propagate in an optical switch. To ensure low polarization sensitivity, a MEMS mirror must be able to steer the two beams in a nearly identical fashion. Turning to FIG. 6, a MEMS mirror 60 is shown having two rigidly connected halves 68A and 68B and a torsional hinge structure 65 for tilting the MEMS mirror 60 about a tilt axis 65'. The two halves 68A and 68B are coated with a reflective coating 63. In operation, two optical beams 62A and 62B, having intensity profiles 61A and 61B, impinge on the reflective coating of the two halves 68A and 68B, forming reflected optical beams 64A and 64B, respectively. Although in this case the mirror thickness of the mirror halves 68A and 68B does not correspond directly to the local intensity of the impinging optical beams 64 and 65, nonetheless, spatially varying the thickness of the MEMS mirror 60 also helps reduce the mirror's moment of inertia. Furthermore, it is possible to customize the mirror 60 for the two-beam application (that is, for steering the two beams 62A and 62B) by thinning down sections 67A and 67B of the two halves 68A and 68B, respectively, because the sections 67A and 67B correspond to low power density of the optical beams 62A and 62B.

Figure 7:
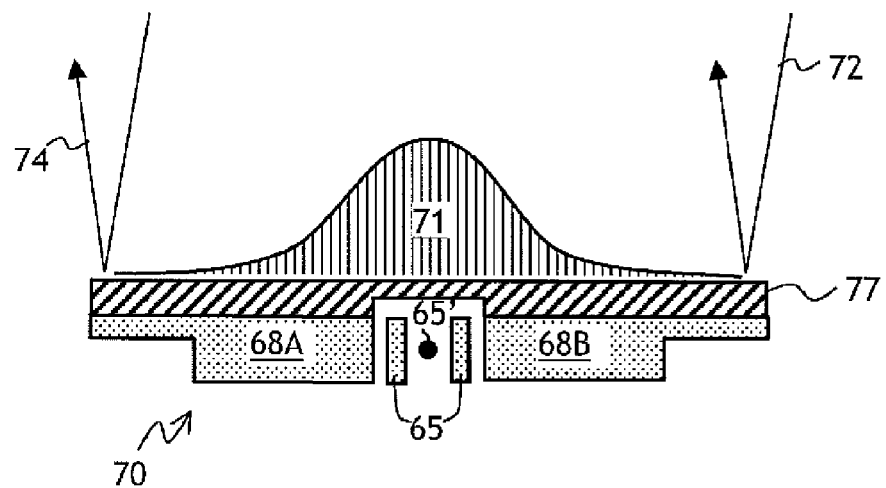
FIG. 7 is a side cross-sectional view of a MEMS mirror having a "hidden-hinge" structure.

Turning now to FIG. 7, a MEMS mirror 70 having a "hidden-hinge" configuration is shown. In the MEMS mirror 70, the hinge structure 65 is "hidden" beneath a mirror layer 77 disposed over the mirror halves 68A and 68B. In this case, the thickness of the MEMS mirror 70 can also be correlated to an intensity profile 71 of an impinging optical beam 72, so that optical quality of a reflected optical beam 74 can be preserved.

Figure 8A:
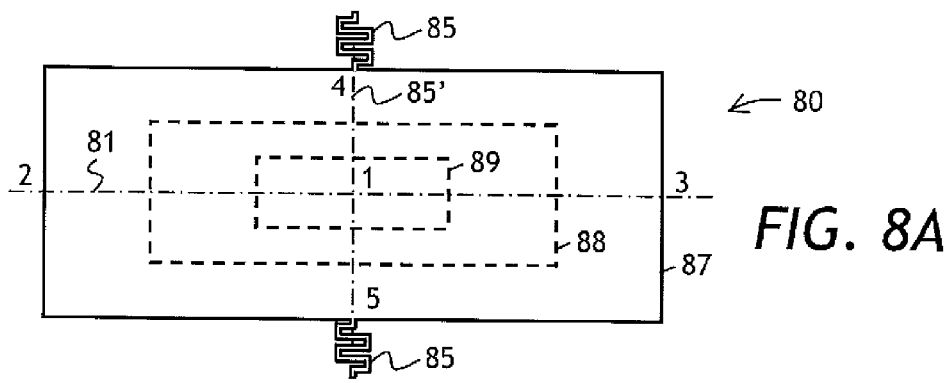
FIGS. 8A and 8B are top and side views, respectively, of a flat mirror having a stepwise varying thickness along the mirror and across the mirror.
Figure 8B:
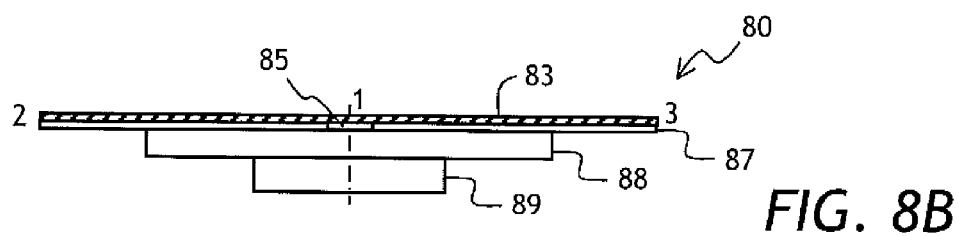

Referring to FIGS. 8A and 8B, a MEMS mirror 80 has a tilt axis 85', a longitudinal, e.g. central, axis 81 perpendicular to the tilt axis 85' and crossing the tilt axis 85' at the point 1. The MEMS mirror 80 has the two ends 2 and 3 disposed on the longitudinal axis 81, and two more ends 4 and 5 disposed on the tilt axis 85'. The thickness of the MEMS mirror 80 decreases in going from the point 1 towards the points 2 and 3; and towards the points 4 and 5. In the MEMS mirror 80, the thickness decreases in stepwise fashion. The location and the magnitude of steps are correlated with the intensity distribution of an impinging optical beam, not shown in FIGS. 8A and 8B. The steps are formed by three rectangular layers 87, 88, and 89, and a pair of torsional hinges 85 for tilting the MEMS mirror 80 about the tilt axis 85'. A reflective layer 83 is disposed on the top rectangular layer 87.

Preferably, the torsional hinges 85 are associated with the thinnest top layer 87. The stepped MEMS mirror 80 can be formed using etching through a succession of generally rectangular etch masks; the mask for the layer 87 can include hinge structures. During etching the layer 87, the torsional hinges 85 can also be formed.

Figure 9A:
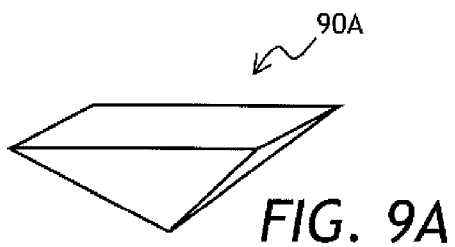
FIGS. 9A and 9B are three-dimensional views of pyramid- and cone-shaped MEMS mirrors.
Figure 10A:
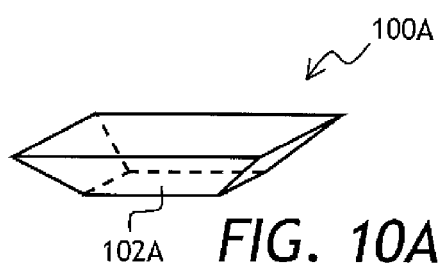
FIGS. 10A and 10B are three-dimensional views of stepped pyramid- and cone-shaped MEMS mirrors.
Figure 9B:
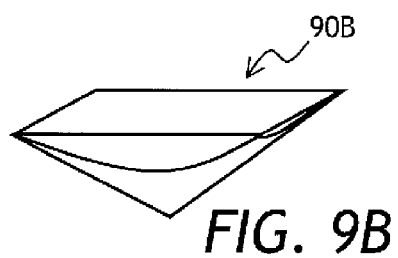
Figure 10B:
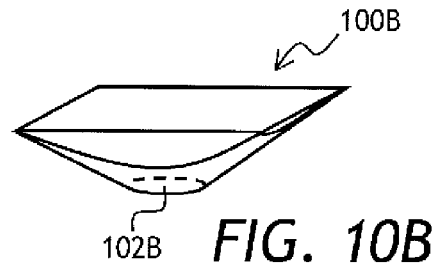

Instead of stepped shape as shown in FIGS. 8A and 8B, the MEMS mirror 80 can have a shape of a cone or a pyramid, or a stepped cone or a pyramid. Referring to FIGS. 9A and 9B, the pyramid-shaped and cone-shaped MEMS mirrors 90A and 90B are shown, respectively. In FIGS. 10A and 10B, truncated (frusto-conical) pyramid-shaped and cone-shaped MEMS mirrors 90A and 90B are presented, respectively. In the MEMS mirrors 90A and 90B, the thickness decreases in going from a centrally located generally flat section 102A and 102B, respectively, to the ends of the MEMS mirror. In FIGS. 9A, 9B, 10A, and 10B, the vertical scale is exaggerated for clarity of presentation.

The MEMS mirrors 20, 30, 40, 50, 60, 70, 80, 90A, 90B, 100A, and 100B can be manufactured using micromachining methods known to one of skill in the art. Generally, at a first step, a continuous mirror wafer, having no voids or ribs therein, is provided. At a second step, the bottom surface is profiled, so as to have its thickness decrease in going from the middle of the mirror towards its edges. The bottom surface profiling is preferably achieved by etching. A graded etch mask can be used to manufacture the MEMS mirrors 20, 30, 90A, 90B, 100A, and 100B; or a plurality of uniform etch masks can be used to manufacture the MEMS mirrors 40, 50, 60, 70, and 80. The thickness of the MEMS mirrors 20, 30, 40, 50, 60, 70, 80, 90A, 90B, 100A, and 100B is preferably correlated with the beam intensity variation, so that the moment of inertia of the manufactured MEMS mirrors can be lessened while keeping a pre-defined quality of the optical beam, which is important in ensuring a good extinction ratio and insertion loss of the MEMS optical switch the MEMS mirrors 20, 30, 40, 50, 60, 70, 80, 90A, 90B, 100A, or 100B are used in. For the stepped MEMS mirrors 40, 50, 60, 70, and 80, height and position of the steps are correlated with the beam intensity variation to achieve the effect of reducing moment of inertia of the MEMS mirrors 40, 50, 60, 70, and 80, while keeping a pre-defined optical quality of the reflected optical beam. The reduced moment of inertia helps increase a frequency of a mechanical resonance of the MEMS mirrors 20, 30, 40, 50, 60, 70, 80, 90A, 90B, 100A, and 100B.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A tiltable MEMS mirror device comprising:
   a substrate;
   a MEMS mirror having a top reflective surface and a profiled bottom surface, and a hinge extending from the MEMS mirror enabling the MEMS mirror to pivot about a tilt axis above the substrate,
   wherein the MEMS mirror has a longitudinal central axis perpendicular to the tilt axis and crossing the tilt axis at a first point, with first and second ends being disposed on the longitudinal axis at the outer free ends thereof,
   wherein the MEMS mirror is absent any voids or ribs therein;
   wherein the profiled bottom surface is such that the MEMS mirror thickness, between the top and bottom surfaces, decreases smoothly and monotonically in going from the first point towards the first and the second ends of the MEMS mirror for reducing a moment of inertia of the MEMS mirror about the tilt axis.

2. The device of claim 1, wherein the MEMS mirror thickness varies substantially linearly in going from the first point to the first and the second ends.

3. The device of claim 1, wherein the MEMS mirror thickness varies substantially exponentially in going from the first point to the first and the second ends.

4. The device of claim 1, wherein the MEMS mirror has third and fourth ends disposed at the outer ends on the tilt axis, and wherein the thickness of the MEMS mirror decreases in going from the first point towards the third and the fourth ends.

5. The device of claim 4, wherein the MEMS mirror is shaped as a cone or a pyramid.

6. The device of claim 5, wherein the MEMS mirror is shaped as a stepped cone or pyramid, wherein the thickness decreases in going from a centrally located generally flat section of the MEMS mirror, including the first point, to the first, the second, the third, and the fourth ends of the MEMS mirror.

7. The device of claim 1, wherein the hinge comprises a torsional hinge for tilting the MEMS mirror about the tilt axis.

8. The device of claim 7, wherein the MEMS mirror includes a plurality of layers, wherein the torsional hinge extends from the thinnest of the plurality of layers.

9. A MEMS optical switch for switching an optical beam having a laterally varying intensity, comprising the tiltable MEMS mirror device of claim 7 for steering the optical beam, the MEMS mirror having a variation of the thickness correlated with the beam intensity variation, whereby the moment of inertia of the MEMS mirror is lessened while keeping a pre-defined quality of the steered optical beam, so as to ensure a pre-defined extinction ratio and insertion loss of the MEMS optical switch.

10. The MEMS optical switch of claim 9, wherein the thickness varies laterally as t(x,y), the beam intensity varies laterally as I(x,y), wherein t(x,y) =c*I$^n$(x,y), wherein n ≥0.5, and c is a constant.

11. A method of manufacturing a MEMS mirror having a tilt axis and a longitudinal central axis perpendicular to the tilt axis and crossing the tilt axis at a first point, and having first and second ends disposed on the longitudinal axis at the outer free ends thereof, the method comprising:
   (a) providing a mirror wafer having a top surface for supporting a mirror layer, and a bottom surface, the mirror wafer being absent any voids or ribs therein; and
   (b) profiling the bottom surface of the mirror wafer, so as to cause the MEMS mirror to have thickness smoothly decreasing in going from the first point towards the first and the second ends for reducing a moment of inertia of the MEMS mirror about the tilt axis.

12. The method of claim 11, wherein step (b) includes a step (b1) of etching the mirror wafer using a graded mask to cause the MEMS mirror to have the decreasing thickness.

13. A method of manufacturing a MEMS optical switch for switching an optical beam having a laterally varying intensity, comprising the method of manufacturing a MEMS mirror of claim 11, wherein the thickness of the MEMS mirror is correlated with the beam intensity variation, whereby the moment of inertia of the manufactured MEMS mirror is lessened while keeping a pre-defined quality of the switched optical beam, so as to ensure a pre-defined extinction ratio and insertion loss of the MEMS optical switch.

* * * * *